May 10, 1949.  H. B. FUGE  2,469,820
DYNAMOELECTRIC MACHINE

Filed June 1, 1945  2 Sheets-Sheet 1

Inventor
Harry B. Fuge
By
William P. Stewart
Attorney

Witness:
Godfrey Pecina

Patented May 10, 1949

2,469,820

UNITED STATES PATENT OFFICE 2,469,820

DYNAMOELECTRIC MACHINE

Harry B. Fuge, Somerville, N. J., assignor to The Singer Manufacturing Company, Elizabeth, N. J., a corporation of New Jersey Application June 1, 1945, Serial No. 597,116

4 Claims. (Cl. 172—36)

This invention relates to dynamoelectric machines and more particularly to ventilating means for cooling motors of the type adapted to be used in automatic control and servo systems and sometimes referred to as low-inertia motors.

These motors are characterized by having large ratios of torque output to rotor inertia and low values of the ratio of the rotor core diameter to the stator core outside diameter. These and other facts concerning this type of motor are set forth in my application Serial No. 563,380, filed November 14, 1944, which has now matured into U. S. Patent No. 2,438,872, to which reference may be had for a better understanding thereof. Considerations of low-inertia motor design for optimum performance in automatic control systems invariably indicate that a small rotor associated with a large stator is desirable. It is not unusual, for example, for the stator weight to be eight or nine times the rotor weight and for the rotor copper loss to be 80% of the total losses in motors of this type. Unfortunately, this condition is productive of abnormally high rotor losses per pound of rotor material. It follows then, that, in many cases, the safe temperature rise of the rotor will be exceeded, even with the auxiliary blower means usually associated with low-inertia motors resulting finally in lowered ratings for a given frame size.

It is, therefore, an object of my invention to provide an improved construction for ventilating low-inertia motors and particularly the rotors thereof, whereby larger outputs can be tolerated without exceeding the limiting allowable temperature rise.

This has been attained by novel control of the entire path of ventilating air, and particularly by means of a nozzle of special shape arranged and positioned to direct a streamlined blast of cooling air initially against one end of the rotor and stator in the vicinity of the air gap. To further assist in this attainment, provision is made for distributing the losses in the rotor winding to utilize this air-blast to best advantage.

With the above and other objects in view, as will hereinafter appear, the invention comprises the devices, combinations, and arrangements of parts hereinafter set forth and illustrated in the accompanying drawings of a preferred embodiment of the invention, from which the several features thereof and the advantages attained thereby will be readily understood by those skilled in the art.

Figure 1:
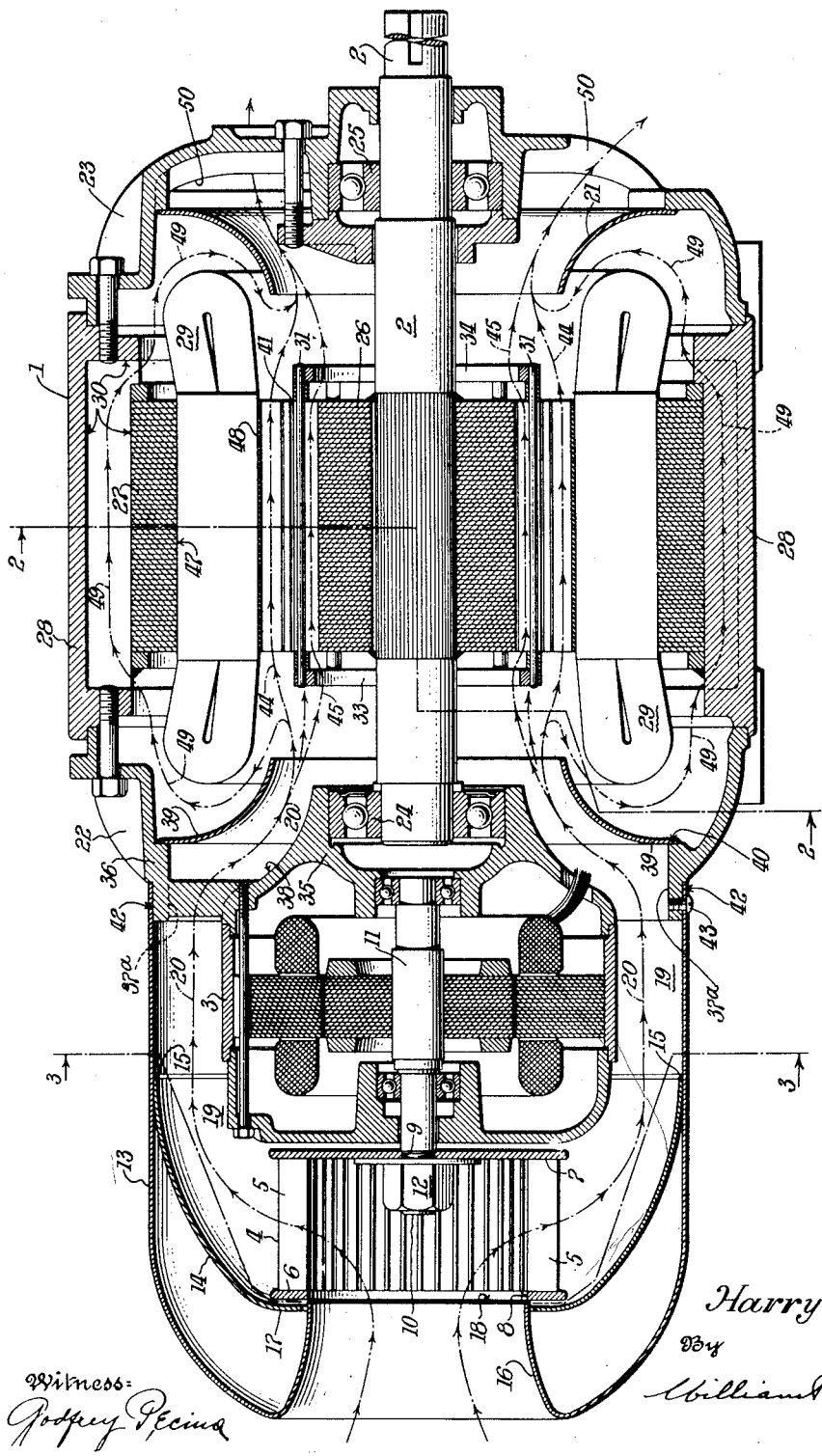
Figure 2:
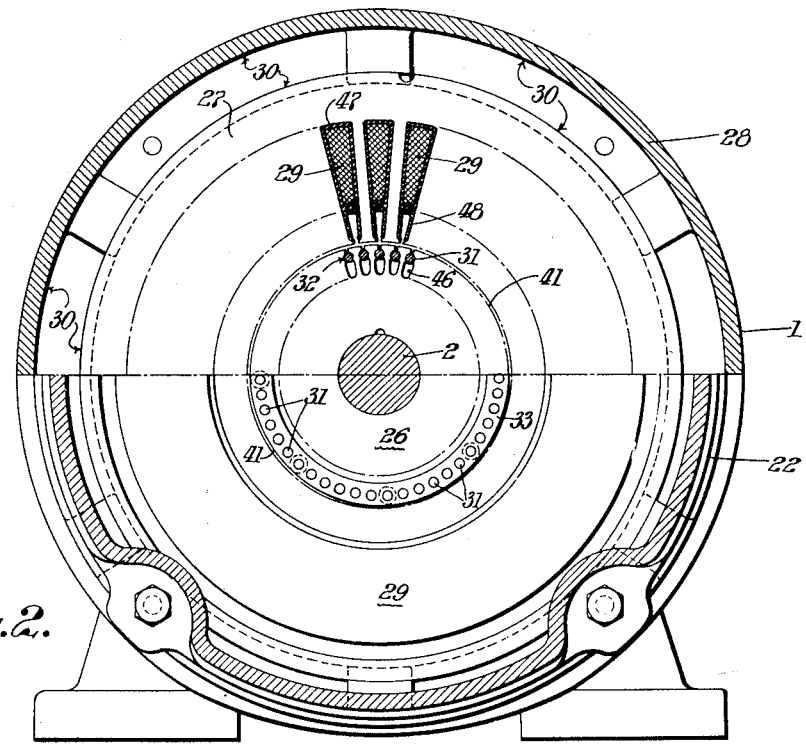
Figure 3:
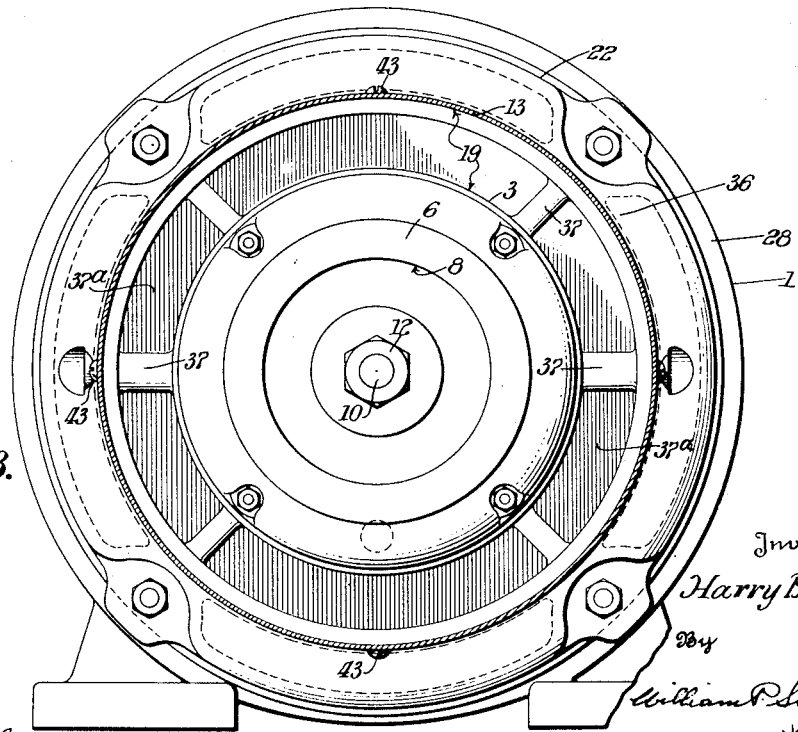

In the accompanying drawings, Fig. 1 is a longitudinal sectional view of a dynamoelectric machine embodying the invention. Fig. 2 is a transverse section of the machine, taken substantially on line 2—2 of Fig. 1. Fig. 3 is a transverse section taken substantially on line 3—3 of Fig. 1.

The low-inertia motor comprises broadly a main or control motor 1 having a power take-off shaft 2 and a separate auxiliary motor 3 attached physically to said control motor 1 and driving a fan rotor 4 for supplying ventilating air to the entire organization.

The fan rotor 4, preferably of the squirrel-cage type, is formed with fan blades 5 held securely between opposed disc-shaped hubs 6 and 7. Hub 6 is formed with a central apertured portion 8 through which air may enter axially, while hub 7 contains a smaller apertured portion 9 for mounting on the extension 10 of a shaft 11. The fan is secured on said shaft extension by means of a nut 12 threaded onto the end of the shaft, as clearly seen in Fig. 1.

A composite entrance orifice and casing for the fan 4 is formed with a generally cylindrical outer part 13 and a similar inner part 14 mounted coaxially within the outer part 13. These casing parts are formed of sheet metal for easy forming by spinning or by drawing and may be welded together as at 15 to form the complete fan casing. The outer part 13 is formed with a central reentrant portion 16 of considerable axial extent to provide a long flared smooth entrance orifice, whereby air approaching the fan is streamlined and purged of local eddying. In this manner, the full inlet area to the fan is utilized for continuous air-flow and represents a considerable improvement in space efficiency. The inner casing part 14 provides a wall which is generally conically convergent toward the entrance orifice 16 and which finally turns in radially, as at 17, where it substantially joins the innermost cylindrical edge 18 of the orifice 16.

This radial portion 17 forms a guard to prevent eddying and reverse flow of the air at the edge 18 of the orifice portion 16. This inturned construction further serves to stiffen the fan casing and thus to hold the orifice portion 16 more rigidly in coaxial alignment with the fan opening 8.

The fan casing forms, with the casing of the auxiliary motor 3, an annular space or fan chamber 19 for collecting air from the fan 4 and confining it to flow longitudinally over the casing of motor 3, as indicated by the arrows 20.

The main or control motor 1 comprises the usual three-part assembly, including a stator core assembly with an end-bell secured at each end thereof. These end-bells, 22 and 23, carry bearings 24 and 25 respectively, secured therein, in which bearings is journaled the shaft 2 on which is mounted a rotor core 26. The stator core assembly is made up of a magnetic laminated stator core 27 held within a frame 28 and carries the usual current-conducting winding 29. Around the inner periphery of the frame 28 are formed longitudinal ventilation ducts 30 to provide cooling air in immediate contact with the stator-core laminations.

Rotor core 26 is made up of a plurality of magnetic laminations stacked together in the usual manner. Conductor bars 31, carried within slots 32, are connected at their ends preferably by brazing to end-rings 33 and 34 to form therewith a squirrel-cage winding. The end-rings 33 and 34 are off-set axially from the ends of said rotor core to provide free access of air to the slots 32 as well as to all sides of the end-rings.

The end-bell 22 is formed with an inner central bearing-receiving portion 35 and an outer annular portion 36 connected to said inner portion by radially disposed and circumferentially spaced web elements 37. The apertures 37ᵃ thus formed between these web elements provide openings for the air to pass from the fan chamber 19 into the interior of the control motor. As illustrated in Fig. 1, the fan casing is mounted on a finished shoulder portion 42 of the end-bell 22 and is removably secured thereto, preferably by means of screws 43.

The outer surface portion 38 of this inner bearing-receiving portion 35 is given a smooth ogee curve contour, as is clearly shown in Fig. 1. A sheet-metal convergent orifice member 39 is located against a vertical face portion 40 of the end-bell 22 and may be secured thereto, for example, by welding. By reference to Fig. 1, it will be seen that the surface portion 38 forms, with the surrounding baffle ring or orifice member 39, a convergent annular nozzle which confines and collects the ventilating air at one velocity and directs it longitudinally and radially inward so that it finally issues as an air blast of annular cylindrical form and of higher velocity directed substantially normally to the surface of an against one end of the stator and the rotor in a radially restricted zone close to and including the air-gap 41 and the end-ring 33, as shown by the arrows 20.

The squirrel-cage rotor winding may be designed so that the larger part of the rotor copper loss occurs in one or both end-rings 33 and 34. This is accomplished by employing one or both end-rings of high resistance relative to the resistance of the conductor-bar portion and is resorted to in the present invention to improve the overall ventilation of the machine. That is to say, the greater part of the rotor copper loss is purposely caused to take place in one or both the end-rings 33 and 34 which are located in the most favorable positions for cooling since they are exposed on all sides. Further, the cool air blast of the instant machine is, upon first entering the control motor casing, directed at high velocity against the end-ring 33. The scrubbing action of the air against the end-ring, thus induced, increases the heat transfer coefficient and thus each cubic foot of air carries away more heat than would be the case without the air blast. In this manner, that part of the machine which ordinarily would get hot the quickest and thus limit the output first, is either delayed in the time taken to reach the allowable temperature rise or is completely replaced as the element limiting the allowable output rating.

It is well known that the end-ring resistance may be modified by changing its sectional area or by employing material of different specific resistance or both. It is preferable, according to the present invention, to employ brass for the end-rings inasmuch as it provides a larger surface area (for cooling) per unit resistance than does copper. The rotor winding is further favored in respect to its ventilation by the fact that the conductor bars 31 are directly exposed on top to the cooling air 44, part of which traverses the air gap 41; said conductor bars being exposed on the bottom to the cooling air 45 traversing the lower unfilled portions 46 of the slots 32 as seen best in Fig. 1.

In order to increase the volume rate of flow of air longitudinally through the machine in the vicinity of the air-gap, so as better to carry off the heat picked up by said air from contact with the conductors and laminations, the stator slots 47 are left open to the air-gap and an unusually deep, hollow slot-wedge 48, also open to the air-gap and made preferably of horn fibre, is employed. This is seen best in Fig. 2, wherein but a few representative rotor and stator slots are shown, it being understood that they extend around the complete periphery at the air-gap in the customary manner. With this increased cross-sectional area of the longitudinal path through the air-gap portion of the machine, together with the special nozzle directing the entering air into one open end of this path, the result is that a large proportion of the total ventilating air which passes through the machine traverses the longitudinal paths in or near to the air-gap and particularly those surrounding the rotor conductor bars.

Some of the ventilating air 49 flows radially outwardly over the end-turns of the stator winding 29 and thence traverses the longitudinal ventilating ducts 30 outside the stator core and then flows radially inward over the opposite end-turns of winding 29 and joins the air from the central paths and finally issues from the machine by way of ordinary vent holes 50 in the end-bell 23 as is best shown by the arrows of Fig. 1. A baffle ring 21, secured to end-bell 23 assists in guiding the air in the desired paths at the exit end of the machine.

This above-described arrangement of the ventilating paths for low inertia motors has been found to be productive of balanced, efficient and effective cooling and prevents a limiting hot spot temperature from being reached in one place long before the rest of the active material has reached a desirable working temperature. That is to say, the construction according to this invention produces a more uniform temperature rise throughout the parts and thus provides for obtaining larger outputs per pound of active material than heretofore for a given temperature rise.

While I have described the principles of operation of my invention, together with the apparatus which I now consider to represent the best embodiment thereof, I desire to have it understood that the apparatus shown and described is only illustrative and that the invention may be carried out by other means.

Having thus set forth the nature of the invention, what I claim herein is:

1. A dynamoelectric machine of the low-inertia type comprising a main motor having a casing housing a stator core and a rotor core, an auxiliary motor, a fan driven by said auxiliary motor, a member secured to the main motor, enclosing said auxiliary motor and providing an entrance orifice and a chamber for said fan, means including said fan chamber for guiding air from said fan into one end of said main motor casing, a bearing hub secured to said main motor casing, and a baffle ring which, together with said bearing hub, form an annular nozzle disposed within said casing for collecting said entering air at one velocity and discharging it at higher velocity within a confined annular zone against an end of each of said stator and rotor cores.

2. A dynamoelectric machine of the low-inertia type comprising a main motor having a casing housing a stator core and a rotor core separated by an air-gap, auxiliary driving means secured to said main motor, a fan driven by said auxiliary means, a composite member providing an entrance orifice and forming with said auxiliary means a chamber for said fan, means including said fan chamber for guiding air from said fan longitudinally into one end of said main motor casing, and an annular convergent nozzle disposed within said casing for collecting said incoming air at one radial level and redirecting it at a lower radial level to discharge against an end of each of said stator and rotor cores in an annular zone including said air-gap.

3. A dynamoelectric machine of the low-inertia type comprising a main motor having a stator frame, and an end-bell secured at each end thereof to form a casing with a stator core and a rotor core held therewithin to form an annular air-gap, longitudinal ventilating ducts in said stator and rotor cores opening into said air-gap, an auxiliary motor, a fan driven by said auxiliary motor, a composite member providing an entrance orifice and forming with said auxiliary motor a chamber for said fan, means including said fan chamber for guiding air longitudinally from said fan through apertures in one of said end-bells into one end of said main motor casing, and a nozzle disposed within said casing for collecting said entering air and directing it into said longitudinal ventilating slots, said air traversing said slots including the air-gap and then discharging to the atmosphere through apertures in the other one of said end-bells.

4. A dynamoelectric machine of the low-inertia type comprising a main motor having a casing housing a laminated stator core and a laminated rotor core separated by an air-gap, conductor-receiving slots in the stator core and in the rotor core opening into said air-gap, said stator slots each having a hollow wedge opened to the air-gap and affording a ventilating duct, said rotor slots each having the top portion filled with a conductor and the bottom portion unfilled to serve as a ventilating duct, an auxiliary motor, a fan driven by said auxiliary motor, a composite member providing an entrance orifice and a chamber for said fan, means including said fan chamber for guiding air from said fan into one end of said main motor casing, and a nozzle disposed within said casing for collecting said entering air and directing it axially at one end of said main motor into said air-gap and said ventilating ducts, whence it flows longitudinally in intimate contact with the laminations of said stator and rotor cores and with the rotor conductors.

HARRY B. FUGE.

REFERENCES CITED

The following references are of record in the file of this patent:

UNITED STATES PATENTS

| Number | Name | Date |
| --- | --- | --- |
| 516,794 | Bell | Mar. 20, 1894 |
| 771,468 | Falk | Oct. 4, 1904 |
| 1,013,753 | Dunn | Jan. 2, 1912 |
| 1,017,257 | Frankenfield | Feb. 13, 1912 |
| 1,373,002 | Hellmund | Mar. 29, 1921 |
| 1,692,371 | Froesch | Nov. 20, 1928 |
| 1,808,845 | Gifford | June 9, 1931 |
| 1,819,228 | Coates | Aug. 18, 1931 |
| 1,848,511 | Adamakas | Mar. 8, 1932 |
| 1,852,476 | Pfleger | Apr. 5, 1932 |

FOREIGN PATENTS

| Number | Country | Date |
| --- | --- | --- |
| 15,148 | Great Britain | 1913 |
| 491,260 | Great Britain | Aug. 30, 1938 |
| 624,063 | Germany | Jan. 11, 1936 |